March 10, 1970 H. R. KRAUSE ET AL 3,499,227
CONTOUR RECORDER
Filed May 6, 1968 3 Sheets-Sheet 3
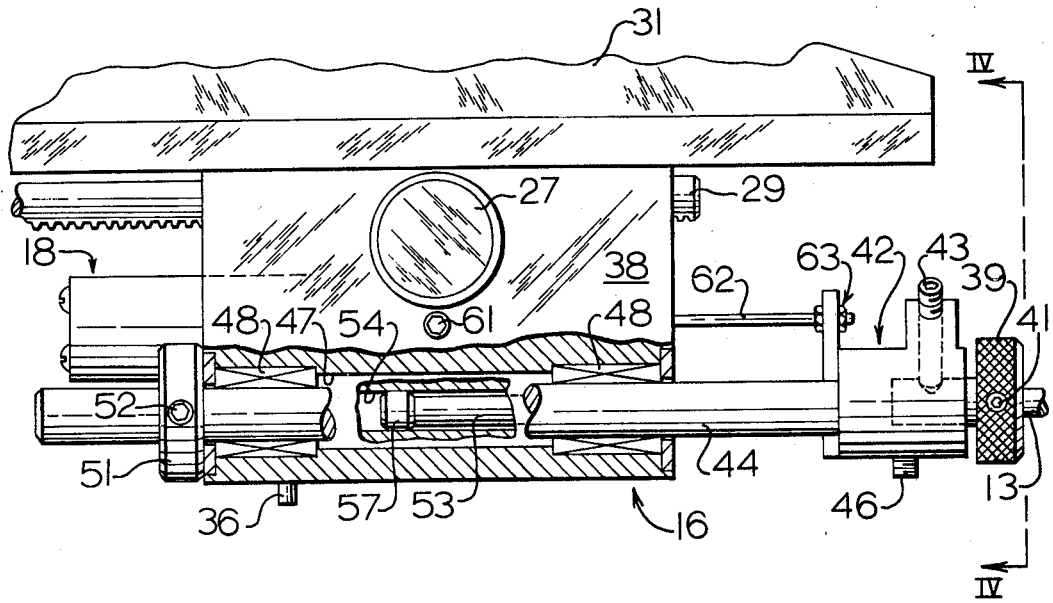
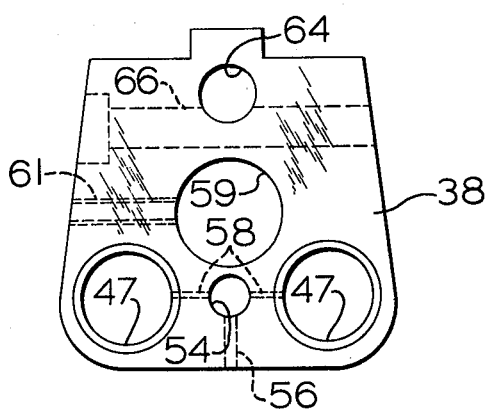
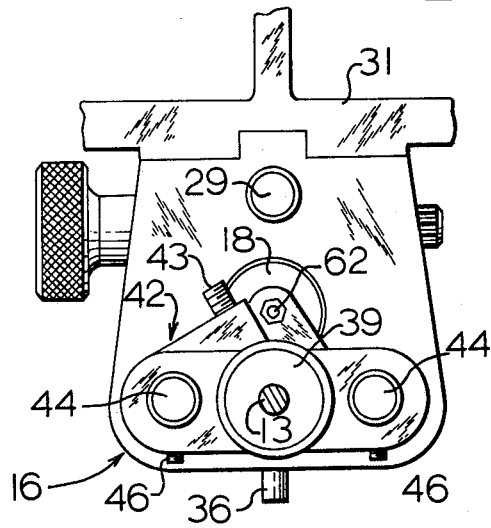
INVENTORS
HAROLD R. KRAUSE
GEORGE A. DOGGETT
ROBERT B. ZIMMERMAN
BY
ATTORNEYS United States Patent Office 3,499,227
Patented Mar. 10, 1970

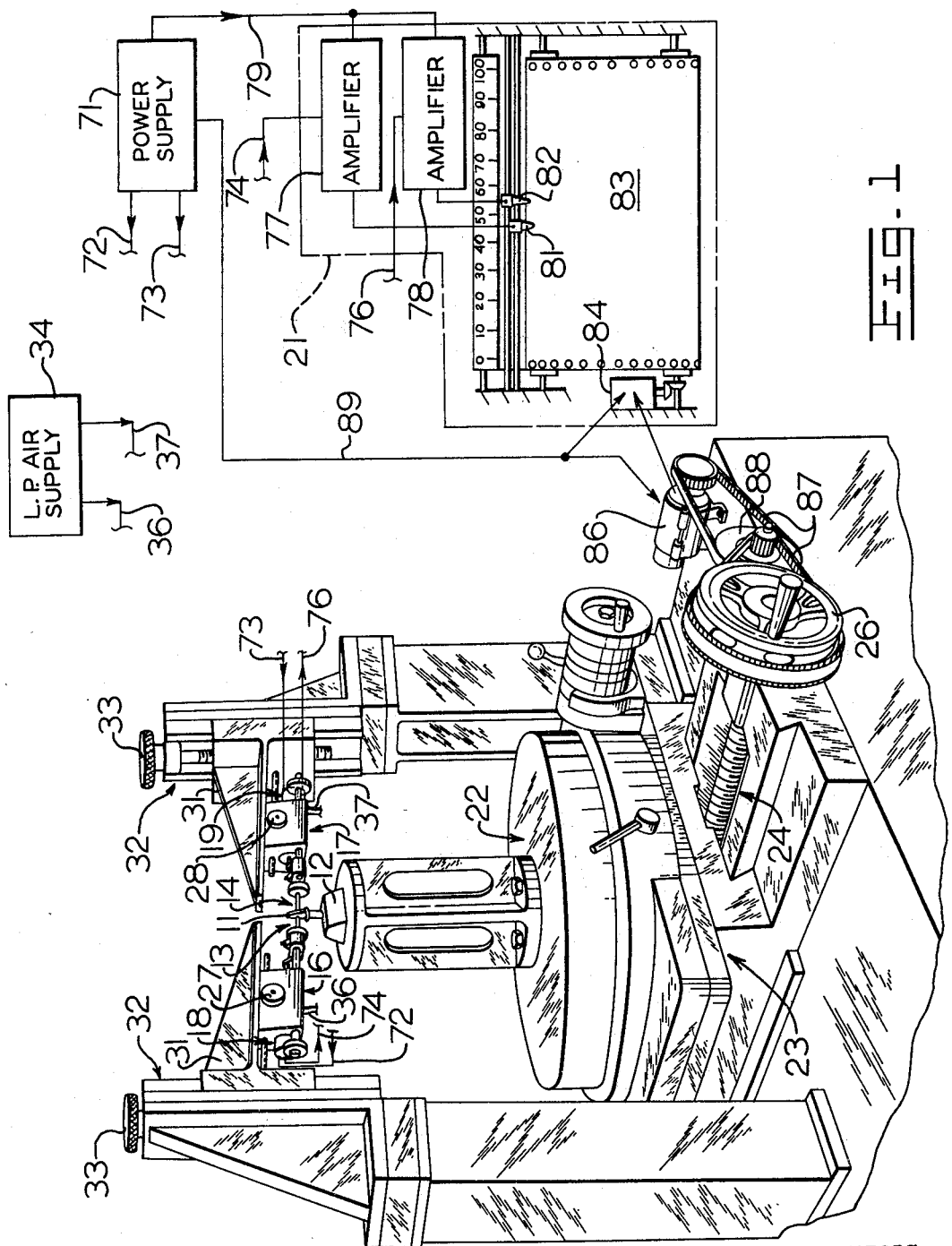
INVENTORS
HAROLD R. KRAUSE
GEORGE A. DOGGETT
ROBERT B. ZIMMERMAN
ATTORNEYS

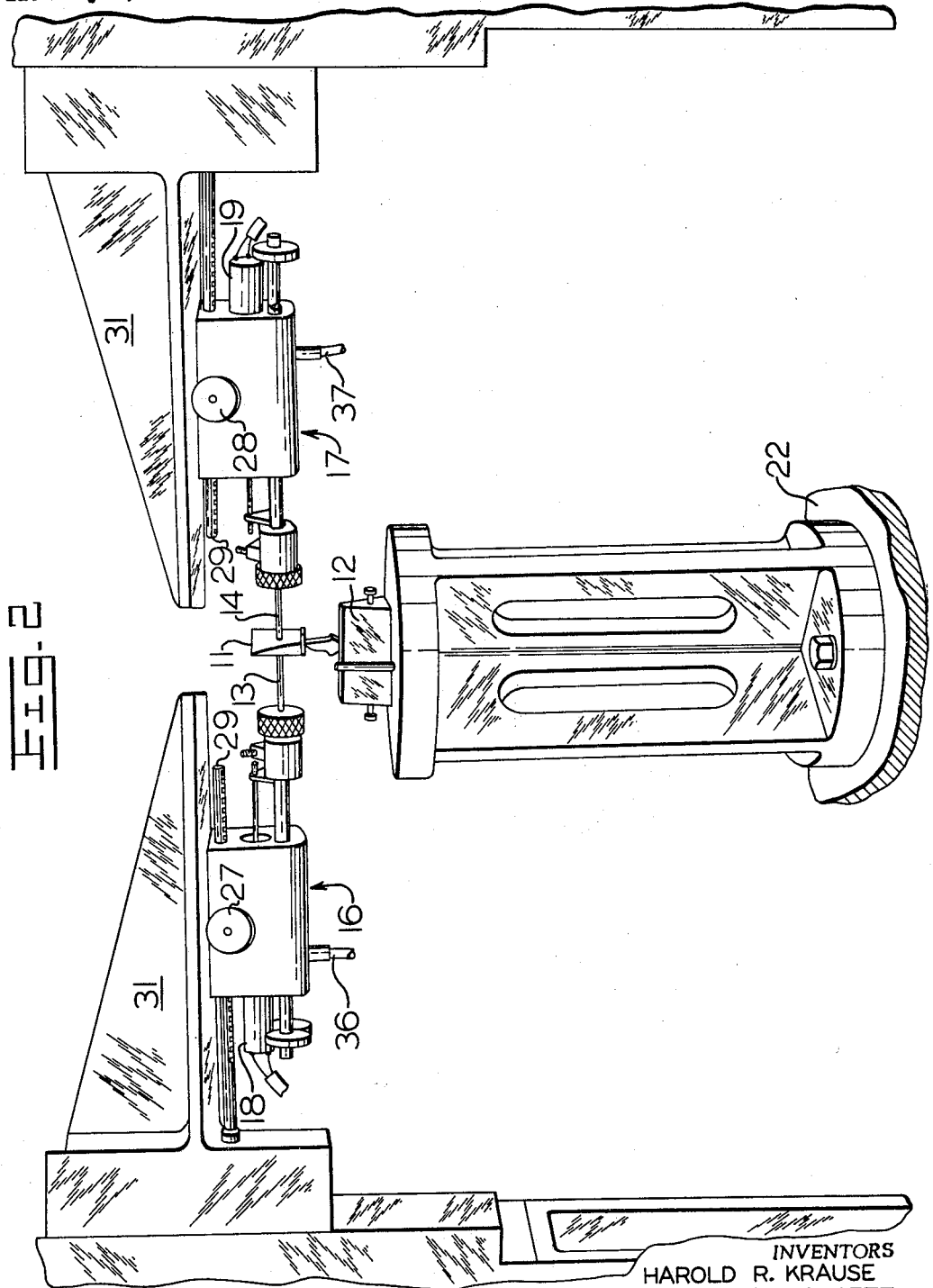

3,499,227
CONTOUR RECORDER
Harold R. Krause, Peoria, George A. Doggett, Mason City, and Robert B. Zimmerman, East Peoria, Ill., assignors to Caterpillar Tractor Co., Peoria, Ill., a corporation of California
Filed May 6, 1968, Ser. No. 726,789
Int. Cl. G01b 7/28
U.S. Cl. 33—174       7 Claims

ABSTRACT OF THE DISCLOSURE

A contour recorder for making a permanent record of cross-sectional configurations of various objects. A mounting for the object movable normally between opposing probes which are to be urged into light, constant contact with the object by regulated low pressure air. Displacement transducers sense the positions of the probes. A chart recorder has styli responsive to the transducers with motion of film past the styli proportional to motion of the object between the probes.

---

It is desirable, particularly for generally free-form objects of critical dimensioning such as turbine blades, to accurately inspect and measure their surface variations and cross-sectional configuration. A common approach is to move the object past a movable probe which is maintained in accurate proximity with its surface. Transducing means may then be employed to sense the instantaneous position of the probe and provide a signal which is representative of the surface variations or contour of the object. A particularly critical part of such apparatus is the means by which the probe is maintained in accurate and constant contact with the varying surface of the object which is moved relative to the probe. If the probe is not in constant contact with the surface, even a minimum gap between the probe and the surface will provide a source of error. On the other hand, if the probe is urged against the surface with excessive force to insure constant contact, indentation or flexure of the surface provides an equally undesirable source of error.

Various techniques have been employed in the prior art to overcome this problem. One approach is to dispose a probe at constant proximity to the surface through optics or electric techniques such as electrostatics. These methods are particularly adapted to the location of individual points on a surface rather than providing an accurate and continuous trace of the surface. Resilient means such as springs have also been employed to urge the probes into contact with the surface. However, as the probe follows surface irregularities, tension of the spring varies and may either permit the probe to lose contact with the surface, cause deformation of the surface or cause skipping by the probe. Any of these conditions would in turn prevent a smooth and accurate transducer signal.

The above equipment as well as the associated transducers and readouts further tend to be complex with high capital costs and involved and time consuming operating expenses.

The present invention overcomes these problems through the use of low pressure air biasing means to urge the probes into constant light contact with the surfaces to be inspected. The amount of pressure applied to the probes remains constant as the probe follows surface irregularities. The accurate positioning of the probe permits the use of transducing and readout equipment which are relatively inexpensive and involve rapid and simple operation while providing accurate results. The present invention further provides means for making a permanent record of surface variations. It provides versatility through the use of a rotating mounting to better align the surface to be inspected with the probe and means for reproducing cross-sectional contours at different magnifications.

It is accordingly an object of the invention to provide improved apparatus for inspecting surface variations.

It is a particular object to accomplish this through the use of a probe urged against the surface by low pressure air biasing means.

It is a further object to provide simple and versatile means for obtaining a permanent record of an inspected cross-sectional contour with selected magnification.

Other objects and advantages of the invention are made apparent in the following description having reference to the accompanying drawings wherein:

FIG. 1 is a perspective view, partially in schematic form, of a contour recorder according to the present invention;

FIG. 2 is an enlarged fragmentary view illustrating a pair of probes positioned along a selected cross-section of a turbine blade with a displacement transducer associated with each probe;

FIG. 3 is an enlarged fragmentary view, with parts in section, of one of the transducer assemblies;

FIG. 4 is a view of the transducer assembly taken from the right end of FIG. 3; and FIG. 5 is an end view, similar to FIG. 4, of the transducer housing alone.

A contour recorder according to the present invention is illustrated in FIG. 1 and partially in FIG. 2 for the purpose of providing an accurate record of the cross-sectional contour of an object such as the turbine blade or foil 11. The apparatus comprises a mounting 12 for securing the blade and a pair of probes 13 and 14 arranged in opposing relation on each side of the blade Assemblies 16 and 17 associated respectively with the probes 13 and 14 perform a variety of functions as will be discussed in greater detail below. Initially, they support the probes for axial motion relative to the blade surface 11. They also direct low pressure, biasing air against the probes to urge them into light constant contact with the surface of the blade and house displacement transducing means represented at 18 and 19, for providing an electrical signal representative of the instant position of each probe. Readout means such as the strip chart recorder 21 receive the output signals from the transducers 18 and 19 to provide a permanent record or trace of the cross-sectional contour of the blade 11. The blade mounting 12 is secured to a rotatable platform or conventional indexing table 22 so that the blade may be rotated in order that its selected cross-section may be presented to the probes in as uniform manner as possible. To provide for relative or translatory motion between the probe and the object for presentation to the probe of the blade cross-section which is to be inspected, the mounting 12 and rotatable platform 22 are supported upon structure 23 which is in turn mounted upon a cross slide 24. An adjusting wheel 26 acts upon the structure 23 through suitable gearing (not shown) to move the blade between the probes in generally normal relation to their axes. The probes 13 and 14 are positionable in selected reference points, which would normally be initial contact with the surface of the blade, by adjustment of the knobs 27 and 28, respectively, as discussed in greater detail below. Adjustment of the knobs 27 and 28 respectively positions the assemblies 16 and 17 relative to racks 29 provided by arms 31 which support the assemblies 16 and 17. The supporting arms 31 are mounted on vertical slides 32. Adjusting screws 33 regulate the elevation of the supporting arms 31 and probes 13 and 14 to permit inspection and recording of any selected cross-section of the blade 11.

Quality control regulations for turbine blades, such as that shown at 11, are illustrative of the characteristics necessary for the present contour recorder. The blades must have an airfoil configuration in cross sections which varies along the length of the blade. Foil portions of the blade may be as thin as 0.030 inch. Accordingly, the probes must be very accurately maintained in contact with the blade surfaces while not exerting sufficient pressure to cause distortion of the blade.

To insure the critical contact between the probes and the blade, air is provided to the assemblies 16 and 17 from a suitable source 34 through lines 36 and 37, respectively, at a regulated and constant low pressure. The assembly 16 is shown in detail in FIG. 3 to more clearly illustrate the air biasing effect upon the probe 13. Construction and operation of the assembly 17 relative to the probe 14 is similar but urges the probe 14 into opposing relation with the probe 13 and will not be discussed further. The assembly 16 comprises a housing 38 which may be longitudinally positioned upon the rack 29 by means of the knob 27.

Having reference now to FIGS. 4 and 5 as well as FIG. 3, the probe 13 is secured within a holder 39 by means of a set screw 41. The holder 39 is in turn mounted within a guide assembly 42 and is secured in place by another set screw 43. A pair of guide rods 44 are secured at the sides of the guide assembly 42 by set screws 46. The guide rods 44 extend oppositely from the probe through bores 47 formed in each side of the housing 38. The guide rods 44 are supported by relatively frictionless bushings 48 situated at each end of the bores 47 to permit relatively free longitudinal motion of the guide assembly 42 and probe 13. The guide rods 44 extend through the housing 38 and are mounted by a collar 51 which is secured to the guide rods by set screws as illustrated at 52. The collar 51 prevents overlapping travel of the probe 13 relative to the probe 14 to prevent damage to the tips of the probes. A piston 53 is centrally secured to the guide assembly 42 and extends into a bore 54 formed through the center of the housing 38. Regulated low pressure air from the conduit 36 enters the closed left end of the bore 54 (as seen in FIG. 3) through a passage 56 shown in FIG. 5 to act upon the piston 53 to urge the probe 13 rightwardly into constant and light contact with the turbine blade (see FIG. 1). With the relatively frictionless support for the probe and guide rods as described above, a very light pressure of generally no more than a few ounces is sufficient to maintain constant contact between the probe 13 and the surface of the turbine blade. To further reduce friction and stabilize the force exerted by air pressure upon the piston 53, the piston head 57 is slightly undersized (for example 0.015 inch) as compared to the inside diameter of the bore 54 so that air leaks past the piston head at a controlled rate. The air source 34 of FIG. 1 is preferably of a type for entraining finely divided lubricant within the low pressure air so that as the air leaks past the piston head 57, it passes into the guide rod bores 47 through cross-cut passages 58 and provides lubrication for the bearings 48 as it escapes to the atmosphere.

The displacement transducer 18 is preferably a conventional differential or linear transformer disposed in a bore 59 formed centrally in the housing 38. The transducer is locked in place within the bore 59 by means of a set screw 61. An actuator or plunger 62 of the transducer extends from the housing 38 and is secured at 63 to the guide assembly 42. Thus the actuator 62 moves with the plunger relative to the transducer 18 so that the transducer provides an electrical signal representative of the instant position of the probe 13 as discussed below with reference again to FIG. 1. Having particular reference to FIG. 5, the bore 64 and cross drilled passage 66, shown in broken lines, respectively receive the rack 29 and adjusting screw 27.

Referring again to FIG. 1, low voltage excitation signals are provided to the transducers from a power supply 71 through lines 72 and 73, respectively. Transducer output signals representative of the instant probe position are communicated through lines 74 and 76 to amplifiers 77 and 78 respectively. Power for the recorder amplifiers 77 and 78 is also provided by the supply 71 through a line 79. The strip chart recorder has a pair of styli 81 and 82 which are separately mounted for lateral motion in response to output signals from the amplifiers 77 and 78, respectively. A strip chart or film 83 is moved past the styli during operation of the transducer so that lateral motion of the styli in response to signals from the transducers provides a permanent trace of the cross-section of the blade upon the film 83. The rate of motion of the film 83 is controlled by a synchro-motor 84 which in turn is regulated by a synchro-generator 86. The generator 86 is driven through a plurality of timing belts 87 and an intermediate pully 88 from the adjusting wheel 26 which regulates motion of the blade 11 between the probes. Power for the synchro-generator and motor set is also provided from the power supply 71 through a line 89.

The present invention makes provision for the common engineering practice of providing drawings at various scales, for example, 10-to-1 or 20-to-1 magnification.

To accomplish this function, the power supply 71 is adjustable to provide either high or low output to the transducers which correspond respectively to the 20-to-1 or 10-to-1 scale. The signals received by the amplifiers 77 and 78 and responsive motion of the styli 81 and 82 are correspondingly varied to provide for the proper scale magnification. It is also necessary to vary the rate at which the film 83 is moved past the styli to further make provision for the desired scale of magnification. Since the synchro-generator and motor set 86, 84 are driven at rates proportional to rotation of the adjusting wheel 26 and accordingly proportional to motion of the blade 11 between the probes, the intermediate pulley 88 is adapted to provide for variable drive ratio to suitably adjust the rate of film motion according to the desired scale of magnification. This is most readily accomplished simply by replacing the intermediate pulley with a similar pulley of different size.

In operation, an object such as the blade 11 is secured to the mounting 12. The supporting arms 31 are vertically adjusted for selection of the cross-section to be inspected and the probes 13 and 14 are initially moved into contact with the blade by means of the adjusting knobs 27 and 28. Actuation of the air supply 34 and power supply 71 provide for operation of the air biasing arrangement and transducers in assemblies 16 and 17 so that as the blade is moved between the probes by rotation of the adjusting wheels 26, the strip chart recorder makes a permanent trace of the cross-sectional contour of the blade at a selected scale of magnification.

Thus the present invention provides a contour recorder capable of rapidly and accurately producing a permanent scaled trace of the cross-sectional contour of an object such as the blade 11 in a single continuous operation. The recorder has been found to provide accuracy within at least ±2% and to be capable of repeating results within at least ±½%.

It is immediately apparent that numerous modifications of the above apparatus are possible within the scope of the present invention. For example, the apparatus has been particularly described with reference to a pair of probes 13 and 14 for inspecting or permanently recording the cross sectional contour of an object such as the turbine blade shown in FIG. 1. However, the invention is also adaptable for inspecting or permanently recording variations in one surface of an object. In that case, only one of the probes for example 13, in one of the assemblies 16, for example, would be used with the probe 13 maintained in contact with the surface to be inspected by the novel air biasing means described above.

What is claimed is:

1. Apparatus for inspecting the cross-sectional configuration of a solid object, comprising:
   means for mounting the object,
   two moveable probes arranged in opposing relation,
   means associated with the probes and object mounting means for moving the object relative to the probes presenting to the probes the cross-section of the object to be inspected,
   a piston respectively associated for movement with each probe, each piston being supported upon relatively frictionless bearings and disposed for longitudinal motion in a bore defined by a housing, each piston being selectively undersized relative to its bore,
   entrained lubricant against the piston to urge the probe against the object, the undersized piston permitting controlled leakage through the bore and past the bearings for lubricating the bearings and stabilizing the air pressure acting upon the piston in order to maintain the probes in light and constant contact with the object,
   displacement transducing means respectively associated with each probe for sensing the instant positions of the probes and providing respective signals representative of the positions of the probes, and
   readout means associated with the transducing means to receive the representative signals.

2. Apparatus for inspecting surface variations of an object, comprising:
   means for mounting the object,
   a moveable probe,
   means associated with the probes and object mounting means for moving the object relative to the probe and presenting to the probe a surface of the object to be inspected,
   a piston respectively associated for movement with the probe, the piston being supported upon bearings and disposed for longitudinal motion in a bore defined by a housing, the piston being selectively undersized relative to its bore,
   air biasing means for directing low pressure air against the piston to urge the probe against the object, the undersized piston permitting controlled leakage through the bore for stabilizing the air pressure acting upon the piston in order to maintain the probe in light and constant contact with the object,
   displacement transducing means associated with the probe for sensing the instant position of the probe and providing a signal representative to the probe position, and
   readout means associated with the transducing means to receive the representative signal.

3. The invention of claim 2 wherein a pair of similar probes are disposed for longitudinal motion and are arranged in opposing relation to each other with the object movable normally therebetween to present to the probes a cross section of the object to be inspected, a similar piston, air biasing means and displacement transducing means being associated with each probe.

4. The combination of claim 3 wherein the displacement transducer respectively associated with the probes provide electrical signals representative of the instant longitudinal position of each probe and the readout means are responsive to the representative signals from the transducers to provide a permanent trace of the cross-sectional contour of the object.

5. The combination of claim 4 wherein the readout means have a movable stylus responsive to each signal and means for moving film past the styli, the means for providing relative motion between the probes and the object comprising translatory means for selectively moving the object mounting normal to the axis of the probes, the readout means being associated with the translatory means so that the film is moved at a rate proportional to the relative motion of the object mounting.

6. The combination of claim 5 further comprising variable timing means associated between the readout means and translatory means to vary the proportional rate of film motion, the motion response of the styli also being selectively variable to provide a tracing of the cross-sectional contour of the object at different scales of selected magnitude.

7. The combination of claim 3 wherein the object mounting is rotatable for selective alignment of the object relative to the probe.

References Cited

UNITED STATES PATENTS

| 2,623,293 | 12/1952 | Nebesar et al. | 33—174 |
| 2,703,457 | 3/1955 | Breisch | 33—174 |
| 3,298,605 | 1/1967 | Bucke et al. | 33—174 |
| 3,343,673 | 9/1967 | Thacker et al. | 33—174 |

SAMUEL S. MATTHEWS, Primary Examiner

U.S. Cl. X.R.

33—143

PO-1050
(5/69)

UNITED STATES PATENT OFFICE
CERTIFICATE OF CORRECTION

Patent No. __3,499,227__  Dated __March 10, 1970__

Inventor(s) __Harold R. Krause, et al__

It is certified that error appears in the above-identified patent and that said Letters Patent are hereby corrected as shown below:

Claim 1, Column 5, line 17, insert (new paragraph) "air biasing means for directing low pressure air with" before --entrained--.

SIGNED AND
SEALED
AUG 11 1970

(SEAL)
Attest:

Edward M. Fletcher, Jr.
Attesting Officer

WILLIAM E. SCHUYLER, JR.
Commissioner of Patents